United States Patent Office 3,772,364

Patented Nov. 13, 1973

3,772,364

METHOD OF OBTAINING THE OPTICAL ANTIPODES D(—)- AND L(+)-ALPHA-AZIDOPHENYLACETIC ACID

Günter Bison, Troisdorf-Sieglar, Paul Janssen, Bensberg-Refrath, and Hans Schübel, Siegburg-Seligenthal, Germany, assignors to Dynamit Nobel Aktiengesellschaft No Drawing. Filed May 23, 1972, Ser. No. 256,055
Claims priority, application Germany, June 5, 1971, P 21 27 991.4; Dec. 18, 1971, P 21 63 032.0
Int. Cl. C07c *117/00*
U.S. Cl. 260—349 13 Claims

ABSTRACT OF THE DISCLOSURE

A method for the preparation of an optically active form of α-azidophenylacetic by contacting DL-α-azidophenylacetic with an optically active form of α-phenylethylamine, recovering a diastereomeric salt thereof and crystallizing out of said salt an optically active form of said α-azidophenylacetic acid; the diastereomeric salt of an optically active form of α-azidophenylacetic acid and an optically active form of α-phenylethylamine.

BACKGROUND OF THE INVENTION

Field of the invention

This invention relates to a method of obtaining the pure antipodes D(—)- and L(+)-α-azidophenylacetic acid. More particularly this invention relates initially to the preparation of a diastereomeric salt of an optically active form of α-azidophenylacetic acid and an optically active form of α-phenylethylamine. More particularly, this invention is directed to the recovery of an optically active form of α-azidophenylacetic acid from such a diastereomeric optically active salt.

DISCUSSION OF THE PRIOR ART

It is known in the prior art, as disclosed in British Pat. 960,665, to treat the racemic DL-α-azidophenylacetic acid in a lower alcohol with an organic base from the group, L-ephedrine, dehydroabietylamine, α-(2-naphthyl)-ethylamine, cinchonidine, cinchonine, quinidine, quinine, brucine, strychnine or morphine, separate the D(—) salt by fractional crystallization, and obtain the free D(—)-α-azidophenylacetic acid therefrom by treatment with acid. Then the L(+) form remaining in the mother liquor after the crystallization can be separated with another optically active auxiliary base, namely (—)-α-(naphthylethylamine), and further processed, or it can be racemized by treatment with an inorganic base. In this known process the use of L-ephedrine is preferred, because higher yields of the D(—) acid are obtained than with the other named organic bases.

The racemate separation of DL-α-azidophenylacetic acid with L-ephedrine, however, is not a very economical process, because the L-ephedrine is the main cost factor in this process. Furthermore, this auxiliary base does not have sufficient selectivity for the racemate separation; for as it can be seen in the table of the cited British patent, several crystallizations from alcohol are required in order to isolate a pure diastereomeric salt. A further disadvantage of this process is the isolation of the L(+)-α-azidophenylacetic acid with (—)-α-2-naphthylethylamine. L-ephedrine forms a crystalline, diastereomeric salt only with D(—)-α-azidophenylacetic acid, not with the L(+) acid. In order to separate the latter, another optically active base must be used, namely (—)-alpha-2-naphthylamine.

SUMMARY OF THE INVENTION

Broadly this invention contemplates a process for the recovery of a diastereomeric optically active salt of an optically active α-azidophenylacetic acid and an optically active form of a substance supplying an optically active form of α-phenylethylamine which comprises contacting an optically inactive form of α-azidophenylacetic acid with a substance supplying an optically active form of α-phenylethylamine.

In a particularly desirable embodiment this invention is directed to the preparation of an optically active form α-azidophenylacetic acid by a process which comprises contacting DL-α-azidophenylacetic acid with an optically active form of α-phenylethylamine, recovering a diastereomeric salt thereof and treating said diastereomeric salt to yield the optically active form of α-azidophenylacetic acid.

The present invention is also directed specifically to novel diastereomeric salts of optically active forms of α-phenylethylamine and α-azidophenylacetic acid. Particularly contemplated diastereomeric salts included in the scope of the present invention are salts of L(—)-α-phenylethylamine and D(—)-α-azidophenylacetic acid as well as D(+)-α-phenylethylamine and L(+)-α-azidophenylacetic acid.

In accordance with the present invention it has been found that by treating an optically inactive form of α-azidophenylacetic acid with an optically active form of α-phenylethylamine that a diastereomeric salt can be formed from which an optically active form of the α-azidophenylacetic acid can be recovered. There is set forth below in tabular form the various routes possible within the scope of the present invention to prepare the diastereomeric salt of an optically active form of α-azidophenylacetic acid and an optically active form of α-phenylethylamine.

TABLE

| Acid reactant | Amine reactant | Diastereomeric salt | Product after cleavage |
|---|---|---|---|
| DL-α-azidophenylacetic acid. | L(—)-α-phenylethylamine. | L(—)-α-phenylethylamine D(—)-α-azidophenyl acidic acid salt. | D(—)-α-azidophenylacidic acid. |
| Do | D(+)-α-phenylethylamine. | D(+)-α-phenylethylamine L(+)-α-azidophenyl acidic acid salt. | L(+)-α-azidophenylacidic acid. |

From the above, it is seen that an intermediate product in the preparation of the optically active form of the α-azidophenylacetic acid is a diastereomeric salt. It has now been found that the optically active form of the acid can be prepared simply by cleavage from such diastereomeric salt. The diastereomeric salts provided by the process of the present invention are new and provide interesting intermediates for the preparation of the optically active forms of the α-azidophenylacetic acid.

The process for the present invention can conveniently be carried out in the presence of a suitable solvent, particularly in oxygen containing solvents. Suitable solvents for the formation of α-phenylethylamine-diastereomeric salts include particularly polar, oxygen containing aliphatic or cycloaliphatic compounds containing up to 8 carbon atoms, and mixtures thereof with water. Particularly contemplated oxygen containing polar solvents are dimethylsulfoxide and dimethylformamide. Other compounds contemplated for use as a solvent in the reaction of the optically inactive α-azidophenylacetic acid and the optically active amine include alcohols, particularly lower alkanols of $C_1$–$C_5$ carbon atoms, ketones, especially of alkyl groups each of which has between $C_1$ and $C_5$ carbon atoms, ether groups especially derived from alkyl containing compounds each alkyl group of which contains up to 5 carbon atoms and mixtures of these substances with one another and with water. Examples of suitable solvents are methanol, ethanol, n-propanol, iso-propanol, n-butanol, sec- and tert-butanol, acetone, diethyl ether, diisopropyl ether and aqueous solutions thereof. They are all included in the following description under the term solvents.

The preparation of the diastereomeric salt can generally be accomplished by contacting the optically inactive α-azidophenylacetic acid with an optically active form of α-phenylethylamine in such a solvent employing stoichiometric amounts of the acid and amine reactant. Generally speaking, however, a ratio of amine to reactant between 0.25:1 and 1:1 will be suitable, preferably between 0.30:1 and 0.50:1. It should be understood, however, that these amounts represent desired and preferred ranges for the relative ratios of the reactants and are not to be considered as critical.

The reaction can be carried out at a temperature between 10° C. and 98° C., preferably between 20° C. and 60° C. Elevated temperatures are considered desirable in the process of the present invention as they tend to facilitate the preparation of the diastereomeric salt. It is not necessary for the reaction to be carried out under any particular conditions of pressure although sub-atmospheric and super-atmospheric pressures can be employed. Desirably, the reaction is carried out at atmospheric pressure.

The quantity of solvent employed should be enough to dissolve the acid and amine reactants employed under the given conditions of temperature and pressure. Consideration should also be given, in the selection of the amount of solvent, to the solubility characteristics of the diastereomeric salt to be prepared. Eventually the diastereomeric salt is crystallized from the solvent and treated to effect cleavage to yield the optically active form of the α-azidophenylacetic acid.

Pursuant to the present invention there is provided the salt of D(−) - α - azidophenylacetic acid with L(−)-α-phenylethylamine as well as the salt of L(+)-α-azidophenylacetic acid with D(+)-α-phenylethylamine. Both of these diastereomeric salts are novel and can be used to form the optically active form of the α-azidophenylacetic acid containing the same.

The optically active form of the α-azidophenylacetic acid is prepared by intially crystallizing the diastereomeric salt from the reaction mixture. Crystallization can be effected using solvents which will extract the salt. Additionally, crystallization can be facilitated through use of crystallization seeds or i.e. seed crystals.

After the cystallization is complete, the diastereomeric salt is treated to effect cleavage of the optically active form of the α-azidophenylacetic acid. Cleavage can be effected by conventional methods. Such methods include treating the diastereomeric salt with an acid or base stronger than the salt. Similarly, ion exchange resins of the acid or base variety can be used to free the desired acid from the salt. For separation of D(−)-α-azidophenylacetic acid from L(−)-α-phenylethylamine-D(−) - α - azidophenylacetic acid, the following acids or bases can be employed: HCl, HBr, $HNo_3$, $H_2SO_4$, and $H_3PO_4$ and so on or NaOH, KOH, $Ca(OH)_2$, $Ba(OH)_2$ and so on.

Similarly, for separation of L(+)-α-azidophenylacetic acid from the diastereomeric salt of D(+)-α-phenylethylamine-L(+)-α-azidophenylacetic acid, the following acids or bases can be employed. Generally speaking, the acids or bases for use in this cleavage process are present in an amount between 5 and 20% by wt. based upon the wt. of the azidophenylacetic acid component of the diastereomeric salt. Accordingly, the concentration of the acid or base is between $>0$ and 38% by wt. The base that is set free during such cleavage process can be recycled into the process of the separation of the racemates.

DESCRIPTION OF PREFERRED EMBODIMENTS

A preferred method for carrying out the present invention involves utilization of water as a solvent with a preparation of the diastereomeric salt. The use of water as the solvent and crystallization medium has the extraordinary advantage that the crystallization of the α-phenylethylamine salts of α-azidophenylacetic acid takes place quite selectively. High yields of volume per unit of time are achieved resulting in a high productivity. As the examples will show, the yield in volume per unit of time is about 100% higher than it is in the process described in German Offenlegungschrift 1,948,667.

Additionally, through the use of pure water as the crystallization medium, all of the process steps that are required for the purification and recovery of the solvent and for the treatment of sewage are eliminated. The process of the invention is especially advantageously employed in the preparation and crystallization of the L(−)-α-phenylethylamine salt of D(−)-α-azidophenylacetic acid.

Generally speaking, the process can be carried out by maintaining the optically inactive α-azidophenylacetic acid component in contact with the optically active α-phenylethylamine component for a period of time between 30 min. and 240 min., preferably between 150 and 180 min. Such periods of time, depending upon the other process parameters employed, are suitable for providing high yields of diasteromeric salt and, consequently, good overall production of the optically active form of the α-azidophenylacetic acid desired. Similarly, the cleavage process utilizing the acid and/or base is performed by maintaining the acid or base in contact with the disteremeric salt for a period of time between 5 and 200 min. Thereafter it can readily be recovered as seen from the examples herein.

It should be stated that a process for the preparation of L-ephedrine salt of D(−)-α-azidophenylacetic acid has been previously described in the German Offenlegungschrift 1,948,667. In that disclosure it was found that the yield and the quality of the diastereomeric salt depended on the properties of the solvent employed. Plain water was not considered to be sufficiently selective to produce the diastereomeric salt in an economical and readily reproducible manner. Therefore, it could not be assumed, that in the preparation of the optically active antipodes of α-azidophenylacetic acid by means of optically active α-phenylethylamine, that water would be an effective medium for this crystallization.

In the process of the present invention an α-phenylethylamine is used. These α-phenylethylamines are quite valuable and can be easily synthesized by the aminizing hydration of acetophenone. As the following examples show, it acts more selectively in a separation of DL-α-azidophenylacetic acid than does L-ephedrine. Thus it provides higher yields in the preparation of the valuable antipodes of α-azidophenylacetic acid.

For the practical performance of the process of the invention, the α-phenylethylamine salt of DL-α-azidophenylacetic acid is first prepared. For this purpose, the two salt-forming components can be dissolved with slight heating in a solvent such as water or isopropanol, and then combined. when L(−)-α-phenylethylamine is used, the diastereomeric salt of D(−)-α-azidophenylacetic acid separates by crystallization and is isolated. Thereafter, it can be broken down to the D(−)-α-azidophenylacetic acid. Likewise, when D(+)-α-phenylethylamine is used, a salt is formed with L(+)-α-azidophenylacetic acid, which can be set free by treatment with dilute acids or basis, for example. Advantageously, depending on the demand for the antipodes, the antipode remaining as a diastereomeric salt in the mother liquor after the separation of an enantiomer can be racemized by conventional methods.

The phenylethylamine salt of D(−)-α-azidophenylacetic acid crystallized out of the solvent in accordance with the invention has a specific rotation $[\alpha]_D^{20}=-75.5°$ (c.=1 in absolute methanol) and melts at 152° C. If this phenylethylacetic acid is obtained as a colorless crystalline substance with a melting point of 59–62° C. and a specific rotation $[\alpha]_D^{20}=-142.6°$ (c.=5 in absolute ethanol).

In like manner, when D(+)-α-phenylethylamine is added to the above mother liquor or to the racemate of the DL-α-azidophenylacetic acid, the diastereomeric salt of L(+)-α-azidophenylacetic acid is obtained which, when isolated and dissolved and then allowed to crystallize out of isopropanol, has a melting point of 139–140° C. and a specific rotation $[\alpha]_D^{20}=+78.5°$ (c.=1 in absolute methanol).

From this salt, by cleavage according to known methods, there has been obtained L(+)-α-azidophenylacetic acid, a white, crystalline substance with a melting point of 59° C.; specific rotation: $[\alpha]_D^{20}=+142°$ (c.=5 in absolute ethanol).

The infrared spectra of the α-phenylethylamine salts of D(−)- and L(+)-α-azidophenylacetic acid are identical and contain the following characteristic bands:

2850 cm.$^{-1}$ ---------- $NH_3^+$.
and corresponding side bands at:

2520 cm.$^{-1}$, 2580 cm.$^{-1}$ 2100 cm.$^{-1}$ ---------- —$N_3$.
1550 cm.$^{-1}$, 1380 cm.$^{-1}$ ---------- $COO^-$.
1220 cm.$^{-1}$ ---------- Lattice vibration.
760 cm.$^{-1}$, 720 cm.$^{-1}$, 690 cm.$^{-1}$ ---------- Aromatic —CH.

In order to more fully illustrate the nature of the invention in the manner of practicing the same, the following examples are presented. It should be understood that all compounds from which dextrorotatory α-azidophenylacetic acid can be obtained are marked L(+) and all those from which levorotatory α-azidophenylacetic acid can be obtained are marked D(−). Similar indications of the optical properties of the phenylethylamine employed herein have been used. Thus, the + sign indicates dextrorotatory properties of the phenylethylamine whereas a − sign indicates levorotatory properties of the same.

EXAMPLE 1

Preparation of α-phenylethylamine salts of α-azidophenylacetic acid and separation of the optically active forms (a) Preparation of the phenylethylamine salt of D(−)-α-azidophenylacetic acid.—A warm solution of 17.7 g. (0.1 mole) of DL-α-azidophenylacetic acid in 90 ml. of isopropanol was added to a warm solution of 12.1 g. (0.1 mole) of L(−)-α-phenylethylamine in 60 ml. of isopropanol and this solution was cooled at 20° C. The salt was filtered out and washed with 100 ml. of isopropanol.

14.9 g. (=100% of the theory) of the phenylethylamine salt of D(−)-α-azidophenylacetic acid was obtained. M.P.=190° C. A specimen dissolved and allowed to recrystallize in 50 ml. of isopropanol had a melting point of 152° C. and a specific rotation $[\alpha]_D^{20}=-75.5°$ (c.=1 in absolute methanol).

(b) Preparation of D(−)-α-azidophenylacetic acid.—For the isolation of the D(−) acid, 10 grams of the phenylethylamine salt crystallizing out of isopropanol in Example 1(a) is dissolved in about 5 ml. of water, 1 ml. of concentrated hydrochloric acid is added, and the mixture is heated for 5 minutes at 40° C. Then the solution is cooled, the D(−) acid is removed by dissolving with ether, and the ether is removed after drying. The residue is dissolved in 3 ml. of benzene and the D(−)-α-azidophenylacetic acid is precipitated from the benzene solution with petroleum ether.

Yield 5 g. (=85%).
M.P. 62° C.
$[\alpha]_D^{20}=-142.6°$ (c.=5 in absolute ethanol).

(c) Preparation of the phenylethylamine salt of L(+)-α-azidophenylacetic acid.—6 g. of D(+)-α-phenylethylamine was added with stirring to a solution of 17.7 g. of DL-α-azidophenylacetic acid in 130 ml. of isopropanol at 40° C., and the mixture was cooled to 20° C. The phenylethylamine salt of the L(+) acid crystallized out and was suction filtered and washed with 60 ml. of isopropanol.

Yield 10.8 g. (=67%).
M.P. 139–140° C.
$[\alpha]_D^{20}=+78.5°$ (c.=1 in absolute methanol).

(d) Preparation of L(+)-α-azidophenylacetic acid.—10 g. of the salt isolated under 1(c) was treated as described in Example 1(b). The following was obtained:

4.5 g. (=76% of the theory of the L(+) acid).
M.P. 59° C.
$[\alpha]_D^{20}=+142.0°$ (c.=5 in absolute ethanol).

EXAMPLE 2

To a solution of 17.7 g. (0.1 mole) of DL-α-azidophenylacetic acid in 100 ml. of isopropanol was added 6.0 g. (0.05 mole) of L(−)-α-phenylethylamine and heated the mixture for 15 minutes at 40° C. Then the clear solution was slowly cooled with stirring and, at 35° C., it was inoculated with a few crystals of the L(−)-α-phenylethylamine salt of D(−)-α-azodiphenylacetic acid. Crystallization occurred spontaneously. After cooling to 20° C. the crystalline mass was suction filtered and washed first with 50 ml. of isopropanol and then with the same amount of ether.

Yield 12 g. (=81.0% of the theory).
M.P. 150–151° C.
$[\alpha]_D^{20}=-74.25°$ (c.=1 in methanol).

The product prepared was the diastereomeric salt of L(−)-α-phenylethylamine salt with D(−)-α-azidophenylacetic acid. The few crystals employed in the example above were used as seeds crystals for the crystallization of this diastereomeric salt.

EXAMPLE 3

To a solution of 17.7 g. (0.1 mole) of DL-α-azidophenylacetic acid in 80 ml. of 10% aqueous ethanol was added 6 grams (0.05 mole) of L(−)-α-phenylethylamine and heated the mixture for 15 minutes at 40–45° C. Then the solution was slowly cooled with stirring and, at 35°, it was inoculated with a few crystals of the L(−)-α-phenylethylamine salt of D(−)-α-azidophenylacetic acid. The crystalline mass that formed was suction filtered at 20° C.

Yield 14 g. (=94% of the theory).
M.P. 144° C.

A specimen dissolved in 10% aqueous ethanol and allowed to crystallize had a melting point of 150° C. and a specific rotation $[\alpha]_D^{20}=-74.58°$ (c.=1 in methanol).

The product was substantially the diastereomeric salt of L(−)-α-phenylethylamine with D(−)-α-azidophenylacetic acid.

EXAMPLE 4

17.7 g. (0.1 mole) of DL-α-azidophenylacetic acid and 6.0 g. (0.05 mole) of L(−)-α-phenylethylamine were dissolved in 75 ml. of acetone and heated for 20 minutes at 40° C. Then the solution was slowly cooled with stirring and at 32° C. it was inoculated with the phenylethylamine salt of D(−)-α-azidophenylacetic acid. The salt that crystallized was suction filtered, washed with 20 ml. of acetone and dissolved and allowed to recrystallize out of 35 ml. of acetone.

Yield 12 g. (=81% of the theory).
M.P. 150° C.
$[\alpha]_D^{20}=-75.5°$ (c.=1 in $CH_3OH$).

The product was substantially the diastereomeric salt of L(−)-α-phenylethylamine with D(−)-α-azidophenylacetic acid.

Example 5 below demonstrates use of a sulfate salt of a levorotatory form of α-phenylethylamine. It also shows the preparation of the diastereomeric salt from a mixture including caustic soda. The solvent employed was water added drop by drop over a period of time. The resultant salt was L(—)-α-phenylethylamine-(—)-α-azidophenylacetic acid salt.

EXAMPLE 5

To a solution of 177 g. of DL-α-azidophenylacetic acid in 410 g. of 10% aqueous caustic solid solution, 64.0 g. of L(—)-α-phenylethylamine sulfate dissolved in 370 ml. of water was added drop by drop, with stirring, over a period of 3 hours. After about 10% of the phenylethylamine sulfate solution had been added, the mixture was inoculated with a few crystals of the phenylethylamine salt of D(—)-α-azidophenylacetic acid ($[\alpha]_D^{20}=-78°$ (c.=1 in absolute methanol)). After all the phenylethylamine had been added, the mixture was stirred for another 45 minutes, the diastereomeric salt that separated was suction filtered and was washed with 100 ml. of water.

97 g. (=87% of the theory with reference to the L(—)-α-phenylethylamine put in) of the phenylethylamine salt of D(—)-α-azidophenylacetic acid with a specific rotation $[\alpha]_D^{20}=-76°$ (c.=1 in absolute methanol).

By cleaving the diastereomeric salt, 56 g. (=84% of the theory) of D(—)-α-azidophenylacetic acid (with reference to the α-phenylethylamine charged) was obtained; optional purity: 98%.

EXAMPLE 6

177 g. of DL-α-azidophenylacetic acid was dissolved in 410 g. of water containing an equivalent amount of caustic soda, and 440 g. of a 15.8% aqueous solution of L(—)-α-phenylethylamine sulfate was added drop by drop with stirring over a period of 3 hours. The reaction mixture was inoculated with optically pure diastereomeric salt and treated as in Example 1.

After the cleavage of the diastereomeric salt, 60 g. (=83% of the theory) of D(—)-α-azidophenylacetic acid (with reference to the phenylethylamine charged) was obtained. The optical purity was 97%.

What is claimed is:

1. A method for the preparation of a diastereomeric salt of an optically active form of α-azidophenylacetic acid and an optically active form of α-phenylethylamine which comprises contacting an optically inactive form of α-azidophenylacetic acid with an optically active form of α-phenylethylamine.

2. A method according to claim 1 wherein the optically active form of α-phenylethylamine is L(—)-α-phenylethylamine.

3. A method according to claim 1 wherein the optically acitve form of α-phenylethylamine is D(+)-α-phenylethylamine.

4. A method according to claim 1 carried out in the presence of a solvent.

5. A method according to claim 4 wherein said solvent comprises water.

6. A method according to claim 4 wherein said solvent is a polar oxygen containing solvent.

7. A method according to claim 6 wherein said solvent is a polar oxygen containing aliphatic or cycloaliphatic compound.

8. A process according to claim 4 wherein after formation of said diastereomeric salt, the diastereomeric salt is separated and treated with either a stronger acid or base and an optically active form of α-azidophenylacetic acid is recovered.

9. A process according to claim 8 wherein the preparation of the diastereomeric salt is carried out at a temperature between 10° C. and 98° C. over a period of time between 30 min. and 240 min.

10. The diastereomeric salt of D(—)-α-azidophenylacetic acid with L(—)-α-phenylethylamine.

11. The diastereomeric salt of L(+)-α-azidophenylacetic acid with D(+)-α-phenylethylamine.

12. A process according to claim 4 crystallization of the diastereomeric salt is facilitated by addition of a minor amount of seed crystals of the diastereomeric salt to be prepared.

13. A method according to claim 1 wherein the optically inactive form of α-azidophenylacetic acid is contacted with the optically active form of an α-phenylethylamine sulfate in the presence of an amount of caustic soda and water is the solvent for the reaction.

References Cited

UNITED STATES PATENTS 3,681,400 8/1972 Rydh -------------- 260—349

JOHN M. FORD, Primary Examiner

PO-1050
(5/69)

UNITED STATES PATENT OFFICE
CERTIFICATE OF CORRECTION

Patent No. 3,772,364 Dated November 13, 1973

Inventor(s) Günter Bison et al

It is certified that error appears in the above-identified patent and that said Letters Patent are hereby corrected as shown below:

Column 6, line 15, the capital "O" in "$D^{2O}$" should be the numeral "0" (zero).

Signed and sealed this 21st day of May 1974.

(SEAL)
Attest:

EDWARD M.FLETCHER,JR.
Attesting Officer

C. MARSHALL DANN
Commissioner of Patents